United States Patent
Su et al.

(10) Patent No.: US 9,979,424 B2
(45) Date of Patent: May 22, 2018

(54) SIGNAL DETECTION METHOD AND DEVICE

(71) Applicant: MStar Semiconductor, Inc., Hsinchu Hsien (TW)

(72) Inventors: Yu-Che Su, Hsinchu Hsien (TW); Tai-Lai Tung, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 7 days.

(21) Appl. No.: 15/219,372

(22) Filed: Jul. 26, 2016

(65) Prior Publication Data

US 2017/0163300 A1 Jun. 8, 2017

(30) Foreign Application Priority Data

Dec. 3, 2015 (TW) .............................. 104140444 A (51) Int. Cl.
- *H04B 3/00* (2006.01)
- *H04B 1/10* (2006.01)
- *H04B 3/54* (2006.01)

(52) U.S. Cl.
CPC ........... *H04B 1/1036* (2013.01); *H04B 3/542* (2013.01)

(58) Field of Classification Search
CPC .............................. H04B 1/1036; H04B 3/542
USPC ............................................ 375/257; 333/12
See application file for complete search history.

(56) References Cited

U.S. PATENT DOCUMENTS

2002/0196095 A1* 12/2002 Kaku ...................... G06F 1/182
333/12

FOREIGN PATENT DOCUMENTS

| CN | 1525642 A | 9/2004 |
| CN | 101729089 A | 6/2010 |
| CN | 101989426 A | 3/2011 |
| CN | 102368858 A | 3/2012 |
| CN | 103297369 A | 9/2013 |

* cited by examiner

Primary Examiner — Chieh M Fan
Assistant Examiner — Fitwi Hailegiorgis
(74) Attorney, Agent, or Firm — Edell, Shapiro & Finnan, LLC (57) ABSTRACT

A signal detection method includes: retrieving a first period component of a signal and at least one second period component adjacent to the first period component; squaring a subtraction result of the first period component and each of the at least one second period component to calculate at least one first square value to further obtain a first detection parameter; squaring an addition result of the first period component and each of the at least one second period component to calculate at least one second square value to further obtain a second detection parameter; dividing the second detection parameter by the first detection parameter to obtain a detection function; determining that the signal is detected when the value of the detection function is greater than or equal to a threshold, or else determining that the signal is not detected.

15 Claims, 8 Drawing Sheets

SIGNAL DETECTION METHOD AND DEVICE

This application claims the benefit of Taiwan application Serial No. 104140444, filed Dec. 3, 2015, the subject matter of which is incorporated herein by reference.

BACKGROUND OF THE INVENTION

Field of the Invention

The invention relates in general to a signal detection method and device, and more particularly to a signal detection method and device for a communication system.

Description of the Related Art

Power Line Communication (PLC), a communication technology developed in the recently years, transmits packets, data or information through existing power lines. As the coverage and penetration rate of power lines are far greater than current various types of wired communication lines, users may carry out data transmission through power sockets without involving additionally deployed lines.

Signal transmission in a PLC system is often accompanied by power transmission, and is thus prone to interference of noises and direct-current (DC) signals. In the prior art, for signal detection, a delay correlator is disposed at a receiver to determine a repetitive period signal in a preamble signal. However, in the above signal detection based on delay correlation, the preamble signal may not be successfully detected in the presence of large noises. Particularly in a PLC network, signal detection may be quite challenging due to the presence of large noises. Further, signal detection errors may also be caused due to excessively large DC signals in a channel, hence reducing the reliability of signal determination and degrading the overall signal processing efficiency. Therefore, there is a need for a signal detection method for solving the above issues.

SUMMARY OF THE INVENTION

It is one of the objects of the present invention to provide a signal detection method and device for a communication system. The signal detection method and device may be applied to an environment with larger noises, e.g., a Power Line Communication (PLC) system, to effectively reduce interference that noises and DC signals causes on signal detection.

The present invention discloses a signal detection method for detecting a signal in a communication system. The signal detection method includes: retrieving a first period component of the signal and at least one second period component adjacent to the first period component; squaring a subtraction result of subtracting the first period component and each of the at least second period component from each other to calculate at least first square value, and summing the at least one first square value to obtain a first detection parameter; squaring an addition result of adding the first period component and each of the at least one second period component to each other to calculate at least one second square value, and summing the at least one second square value to obtain a second detection parameter; dividing the second detection value by the first detection parameter to obtain a detection function; and determining that the signal is detected when the value of the detection function is greater than or equal to a first threshold, and determining that the signal is not detected when the value of the detection function is smaller than the first threshold.

The present invention further discloses a signal detection device for detecting a signal in a communication system. The signal detection device includes a first delay circuit, a first calculation circuit, a second calculation circuit, a divider and a first determining module. The first delay unit delays a first period component of the signal to retrieve a second period component adjacent to the first period component. The first calculation circuit, coupled to the first delay circuit, includes a subtractor, a first squaring circuit and a first summing circuit. The subtractor subtracts the first period component and the second period component from each other to obtain a subtraction result. The first squaring circuit squares the subtraction result to obtain a first square value. The first summing circuit sums the first square value of a period to obtain a first detection parameter. The second calculation circuit, coupled to the first delay circuit, includes an adder, a second squaring circuit and a second summing circuit. The adder adds the first period component and the second period component to obtain an addition result. The second squaring circuit squares the addition result to calculate a second square value. The second summing circuit sums the second square value of the period to obtain a second detection parameter. The divisor, coupled to the first calculation circuit and the second calculation circuit, divides the second detection parameter by the first detection parameter to obtain a detection function. The first determining module, coupled to the divider, receives the detection function, determines that the signal is detected when the value of the detection function is greater than or equal to a first threshold, and determining that the signal is not detected when the value of the detection function is smaller than the first threshold.

The above and other aspects of the invention will become better understood with regard to the following detailed description of the preferred but non-limiting embodiments. The following description is made with reference to the accompanying drawings.

DETAILED DESCRIPTION OF THE INVENTION

As previously described, generally in a communication system, a receiver adopts a delay correlator for signal detection. The delay correlator continues operating to determine whether a signal received includes a repetitive period signal in a preamble signal. It means that the packet has arrived at the receiver when it is determined that the preamble signal is present, and the receiver begins to receive the signal. On the other hand, the receiver does not perform reception and continues detecting when it is determined that the preamble signal is not present.

Figure 1:
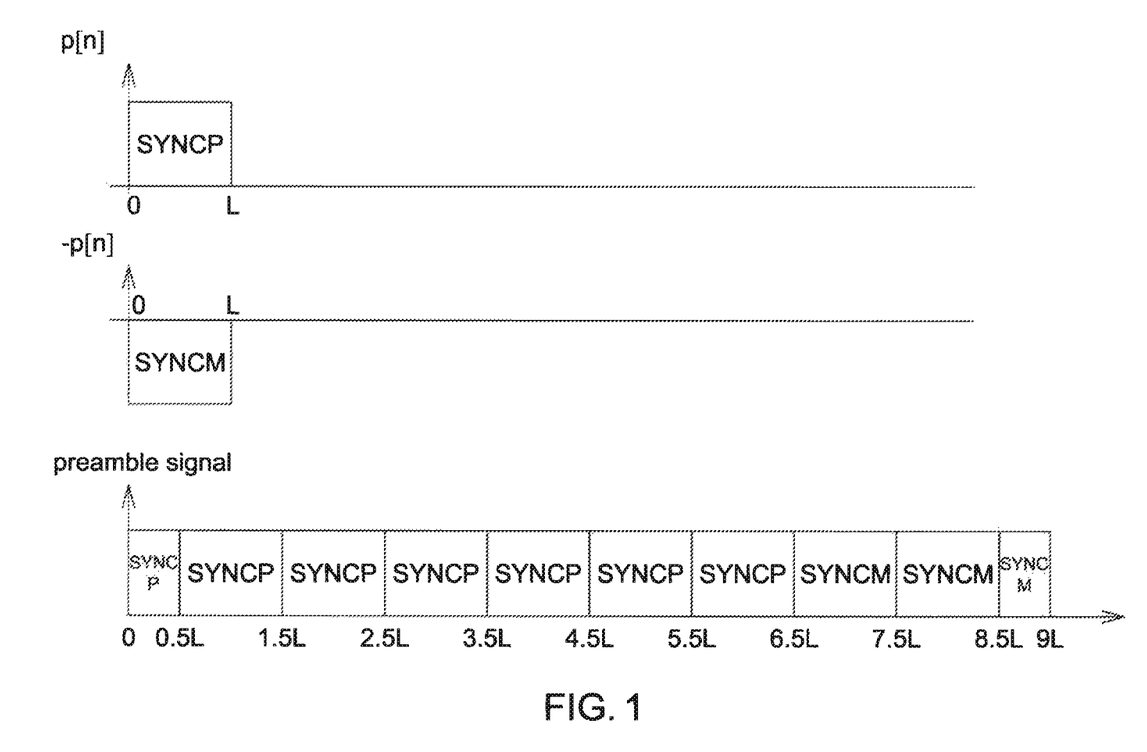
FIG. 1 is a schematic diagram of a format of a preamble signal of a packet in a PLC system.

Taking signal transmission of a Power Line Communication (PLC) system for instance, the receiver continuously determines whether a preamble signal is detected. According to PLC protocols, the preamble signal in each packet has a fixed periodic format. FIG. 1 shows a schematic diagram of a format of a preamble signal of a packet in a PLC system. As shown in FIG. 1, the preamble signal includes 9 period components, each having a length L. Among the 9 periodic components, 6.5 period components are SYNCP, the last 2.5 inverted period components are SYNCM, and the foremost end of the preamble signal is a signal including one-half period length.

The delay correlator delays the preamble signal by one period L, and the performs integration with itself, with the calculation as below:

$$\int_0^L (p(t)+w(t))(p(t-L)+w(t-L))dt \quad (1)$$

In the above equation, p(t) and p(t−L) represent two adjacent period components of the signal, and w(t) and w(t−L) represent noises in the signal. As p(t) and p(t−L) are two period components of the signal of the same period, they are highly correlated (i.e., having identical or similar signal waveforms). Thus, after the integration, a larger output value can be generated. The receiver determines whether the preamble signal is received according to the output value. However, when the noise is large or signal attenuation is severe in a way that the noise is far greater than the signal, equation (1) may be simplified as:

$$\int_0^L (w(t))(w(t-L))dt \quad (2)$$

In the above situation, the delay correlator can only detect the noise but not the signal. Thus, the above signal detection method is inapplicable to a PLC system where a large noise or severe signal attenuation is present.

On the other hand, when the delay correlator receives a direct-current (DC) signal, the output value is:

$$\int_0^L (p(t)+w(t)+V\_DC)(p(t-L)+w(t-L)+V\_DC)dt \quad (3)$$

In equation (3), V_DC represents the DC signal. In the above situation, the DC signal V_DC generates a larger output value that may cause the receiver in misjudging the preamble signal. When the receiver erroneously determines that the preamble signal has arrived, it starts receiving the signal. The signal is decoded at a backend into incorrect data, which is then discarded. As such, not only operation resources are wasted but also the efficiency of the processor is degraded.

Figure 2:
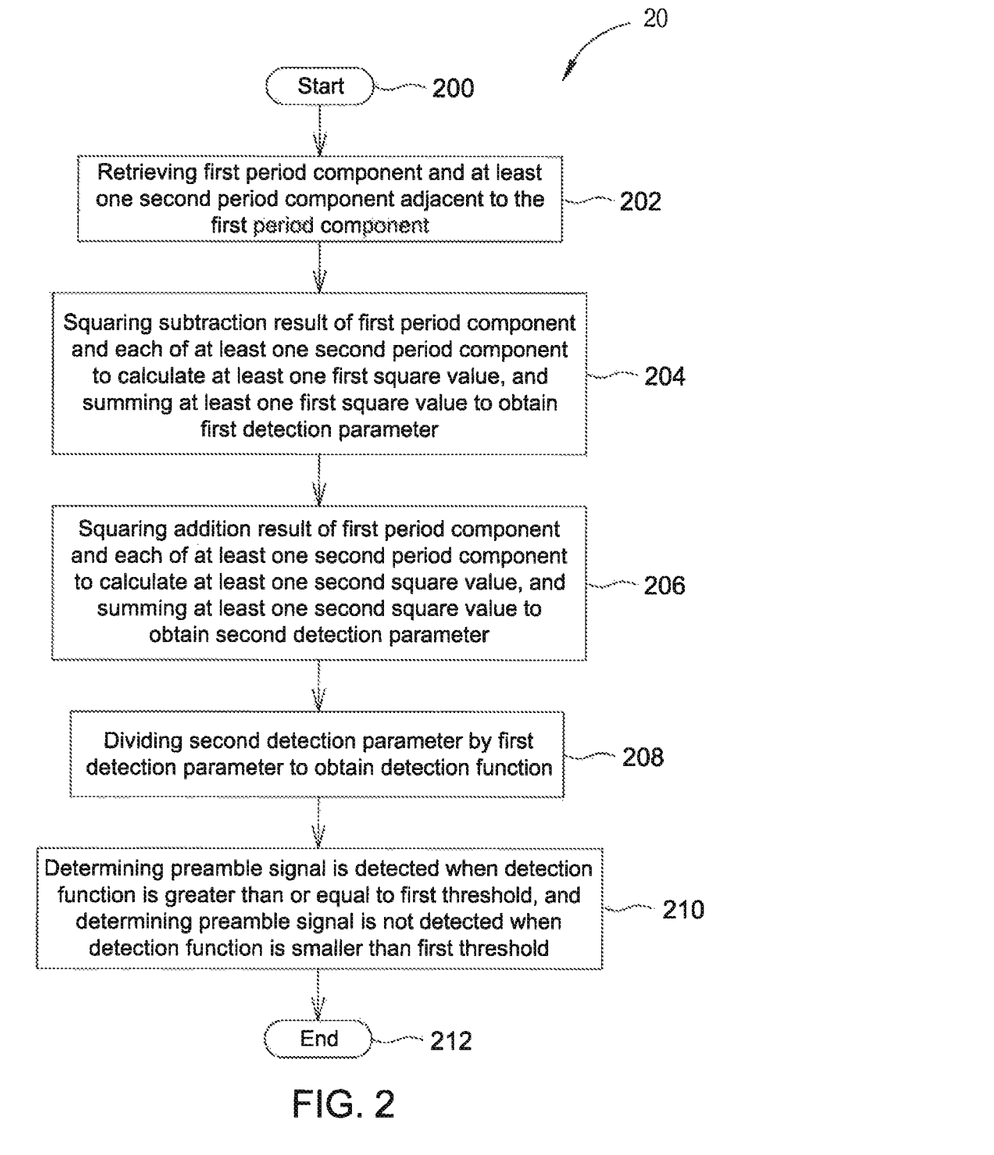
FIG. 2 is a flowchart of a signal detection process according to an embodiment of the present invention.

The present invention provides a signal detection method that calculates a received signal in a digital logic circuit of a receiver to realize the detection of a preamble signal. FIG. 2 shows a flowchart of a signal detection process 20 according to an embodiment of the present invention. As shown in FIG. 2, the signal detection process 20 may be performed at a receiver circuit of a PLC system to detect a preamble signal of a packet. The signal detection process 20 includes following steps.

In step 200, the signal detection process 20 begins.

In step 202, a first period component of the signal and at least one second period component adjacent to the first period component are retrieved.

In step 204, a subtraction result of subtracting the first period component and each of the second period component of the at least one second period component from each other is squared to calculate at least one first square value, and the at least one first square value is summed to obtain a first detection parameter.

In step 206, an addition result of adding the first period component and each of the second period component of the at least one second period component to each other is squared to calculate at least one second square value, and the at least one second square value is summed to obtain a second detection parameter.

In step 208, the second detection parameter is divided by the first detection parameter to obtain a detection function.

In step 210, when the value of the detection function is greater than or equal to a first threshold, it is determined that the preamble signal is detected; when the value of the detection function is smaller than the first threshold, it is determined that the preamble signal is not detected.

In step 212, the signal detection process 20 ends.

An example of the format of a preamble signal in FIG. 1 is given in detail with reference to the signal detection process 20.

In a PLC system, assuming that a first period component of a preamble signal is p[n] and the period length is L, the receiver may retrieve at least one second period components p[n−L], p[n−2L], p[n−3L] . . . adjacent to the first period component p[n] (step 202). According to the packet format of PLC, the preamble signal includes 7 consecutive identical period components. Taking off the first period component, the at least one second period component may include 6 period components at most. It should be noted that, the number of the at least one second period component may be adjusted based on system requirements and different communication applications, and is not limited to the above exemplary value.

A subtraction result of subtracting the first period component p[n] from each second period component of the at least one second period component from each other is squared to calculate at least one first square value, and the at least one first square value is summed to obtain a first detection parameter $S_1[n]$ (step 204). For example, assuming the at least one second period component includes 3 second period components p[n−L], p[n−2L] and p[n−3L], the first detection parameter $S_1[n]$ may be calculated through the following:

$$S_1[n]=\Sigma_{k=0}^{L-1}(p[n-k]-p[n-k-L]+w[n-k]-w[n-k-L])^2 +\Sigma_{k=0}^{L-1}(p[n-k]-p[n-k-2L]+w[n-k]-w[n-k-2L])^2+\Sigma_{k=0}^{L-1}(p[n-k]-p[n-k-3L]+w[n-k]-w[n-k-3L])^2 \quad (4)$$

In equation (4), p represents the signal in the period components, and w represents the corresponding noise. It is known from equation (4) that, the 3 main components in the first detection parameter $S_1[n]$ are 3 first square values of 3 subtraction results obtained from respectively subtracting the first period component p[n] and the second components p[n−L], p[n−2L] and p[n−3L] from each other.

Further, the addition result from adding the first period component p[n] and each of the second period component of the at least one second period component to each other is squared to calculate at least one second square value, and the at least one second square value is summed to obtain a second detection parameter $S_2[n]$ (step 206). For example, assuming the at least one second period component includes 3 second period components p[n−L], p[n−2L] and p[n−3L], the second detection parameter $S_2[n]$ may be calculated through the following:

$$S_2[n]=\Sigma_{k=0}^{L-1}(p[n-k]+p[n-k-L]+w[n-k]+w[n-k-L])^2+\Sigma_{k=0}^{L-1}(p[n-k]+p[n-k-2L]+w[n-k]+w[n-k-2L])^2+\Sigma_{k=0}^{L-1}(p[n-k]+p[n-k-3L]+w[n-k]+w[n-k-3L])^2 \quad (5)$$

In equation (5), p represents the signal in the period components, and w represents the corresponding noise. It is known from equation (5) that, the 3 main components in the second detection parameter $S_2[n]$ are 3 second square values of 3 addition results obtained from respectively adding the first period component p[n] and the second components p[n−L], p[n−2L] and p[n−3L] to each other.

To simplify the calculation, in the embodiments below, the at least one second period component includes only one single second period component p[n−L]. Thus, the first detection parameter $S_1[n]$ and the second detection parameter $S_2[n]$ may be respectively simplified as:

$$S_1[n]=\Sigma_{k=0}^{L-1}(p[n-k]-p[n-k-L]+w[n-k]-w[n-k-L])^2 \quad (6)$$

$$S_2[n]=\Sigma_{k=0}^{L-1}(p[n-k]+p[n-k-L]+w[n-k]+w[n-k-L])^2 \quad (7)$$

It should be noted that, the sum of square of an addition result of two signals may be represented as four times of the energy of the signal. The signals p[n] and p[n−L] are different period components of the same period signal. Thus, in the above situation, the signals p[n] and p[n−L] have the same waveform:

$$p[n]=p[n-L] \quad (8)$$

The energy of the signals p[n] and p[n−L] may be represented as:

$$Ep=\Sigma_{k=0}^{L-1}(p[n])^2=\Sigma_{k=0}^{L-1}(p[n-L])^2 \quad (9)$$

Further, the energy of the noises w[n] and w[n−L] may be represented as:

$$Ew=\Sigma_{k=0}^{L-1}(w[n])^2=\Sigma_{k=0}^{L-1}(w[n-L])^2 \quad (10)$$

It should be noted that, based on characteristics of additive White Gaussian noise (AWGN), the noise correlation on different signals is 0, and the correlation between noises and signals is also 0; that is:

$$E[w[n]w[n-L]]=E[w[n]p[n]]=0 \quad (11)$$

By substituting equations (8) to (11) into equations (6) and (7), following is obtained:

$$S_1[n]=2Ew \quad (12)$$

$$S_2[n]=4Ep+2Ew \quad (13)$$

Thus, after calculating the first detection parameter $S_1[n]$ and the second detection parameter $S_2[n]$, the second detection parameter $S_2[n]$ is divided by the first detection parameter $S_1[n]$ to obtain a detection function $\xi[n]$ below (step 208):

$$\xi[n]=\frac{S_2[n]}{S_1[n]}=\frac{4Ep+2Ew}{2Ew}=2\frac{Ep}{Ew}+1=2\gamma+1 \quad (14)$$

In equation (14), γ represents a signal-to-noise ratio (SNR) of the preamble signal. That is, the value of the detection function $\xi[n]$ is equal to twice the SNR plus 1. Further, when the receiver circuit does not receive a periodic signal and only the noise is present, following is obtained:

$$\xi[n]=1 \quad (15)$$

That is to say, the value of the detection function $\xi[n]$ is greater than 1 when the preamble signal is detected, or else is equal to 1 when the signal is not detected. Thus, a threshold $\eta_1$ greater than 1 may be set. It is determined that the signal is detected when the value of the detection function $\xi[n]$ is greater than or equal to the threshold $\eta_1$, and it is determined that the signal is not detected when the value of the detection function $\xi[n]$ is smaller than the threshold $\eta_1$ (step 210). In one embodiment, the value of the threshold may be determined according to the SNR requirement of the system. For example, it may be set that, it is determined that the signal is detected when the SNR γ is greater than or equal to a minimum SNR $\gamma_{min}$, and it is determined that the signal is not detected when the SNR γ is smaller than the minimum SRN $\gamma_{min}$. In the above situation, the threshold $\eta_1$ may be set to $1+2\gamma_{min}$.

Further, when subtraction or addition calculations are performed according to multiple second period components and the first period components, the first detection parameter $S_1[n]$ and the second detection parameter $S_2[n]$ are proportionally increased. As the detection function $\xi[n]$ is obtained from dividing the second detection parameter $S_2[n]$ by the first detection parameter $S_1[n]$, given the first detection parameter $S_1[n]$ and the second detection parameter $S_2[n]$ are proportionally increased, the calculation result of the detection function $\xi[n]$ remains unaffected.

Figure 3A:
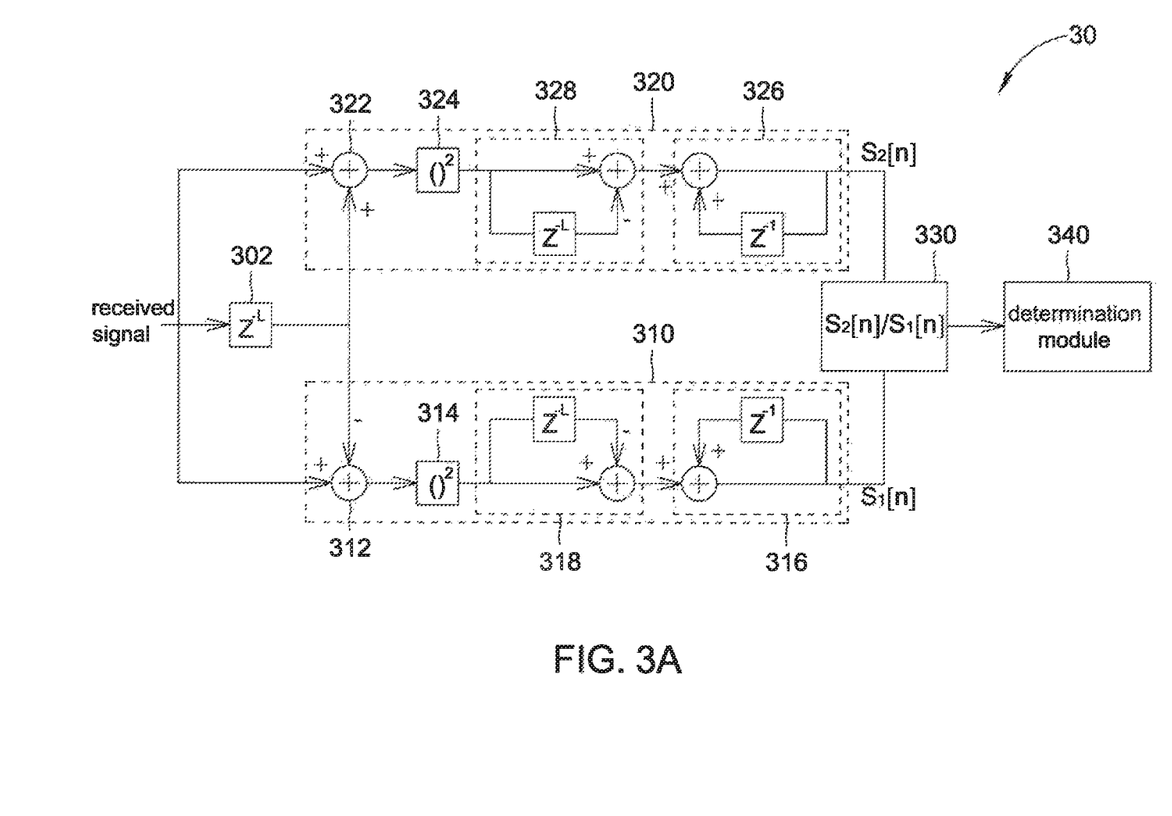
FIG. 3A is a schematic diagram of a signal detection device according to an embodiment of the present invention.

The above signal detection process and method may be realized by a digital logic circuit. FIG. 3A shows a schematic diagram of a signal detection device 30 according to an embodiment of the present invention. As shown in FIG. 3A, the signal detection device 30 includes a delay unit 302, calculation units 310 and 320, a divider 330 and a determination module 340. The delay unit 302 delays a first period component p[n] of a preamble signal, and retrieves a second period component (e.g., p[n−L]) adjacent to the first period component p[n]. The calculation units 310 and 320, coupled to the delay unit 302, respectively calculate a first detection parameter $S_1[n]$ and a second detection parameter $S_2[n]$. The divider 330, coupled to the calculation units 310 and 320, divides the second detection parameter $S_2[n]$ by the first detection parameter $S_1[n]$ to obtain a detection function $\xi[n]$. The determination module 340 receives the detection function $\xi[n]$ for determination. When the value of the detection function $\xi[n]$ is greater than or equal to a first threshold, the determination module 340 determines that the preamble signal is detected; when the value of the detection function $\xi[n]$ is smaller than the first threshold, the determination module 340 determines that the preamble signal is not detected.

More specifically, the calculation unit 310 includes a subtractor 312, a squaring unit 34, a summing unit 316 and a replacing unit 318. The subtractor 312 subtracts the first period component p[n] and a second period component p[n−L] of the at least one second period component to obtain a subtraction result. The squaring unit 314 squares the subtraction result to obtain a first square value. The summing unit 316 sums the first square value of a period to obtain the first detection parameter $S_1[n]$. That is to say, the summing unit 316 may be regarded as the summation symbol Σ in equation (6) to calculate the sum of the first square values (i.e., the sum of k=0 to k=L1). The replacing unit 318 replaces the first square value of the period by another first square value of a next period, with the period length being L in this example. That is to say, the signal detection device 30 is capable of continuously receiving signals from the channel, and replacing an old signal by a new signal to continuously generate a new calculation result. On the other hand, the calculation unit 320 includes an adder 322, a squaring unit 324, a summing unit 346 and a replacing unit 328. The adder 322 adds the first period component p[n]

and a second period component p[n−L] of the at least one second period component to each other to obtain an addition result. The squaring unit 324 squares the addition result to calculate a second square value. The summing unit 326 may be regarded as the summation symbol Σ in equation (7) to calculate the sum of the second square values (i.e., the sum of k=0 to k=L1). The replacing unit 328 replaces the second square value of the period by another second square value of a next period. That is to say, the signal detection device 30 is capable of continuously receiving signals from the channel, and replacing an old signal by a new signal to continuously generate a new calculation result. Further, the summing units 316 and 326 may be chiefly formed by a delayer and an adder, and the replacing units 318 and 328 may be chiefly formed by a delayer and a subtractor, as shown in FIG. 3A. The delayer may be a register.

Figure 3B:
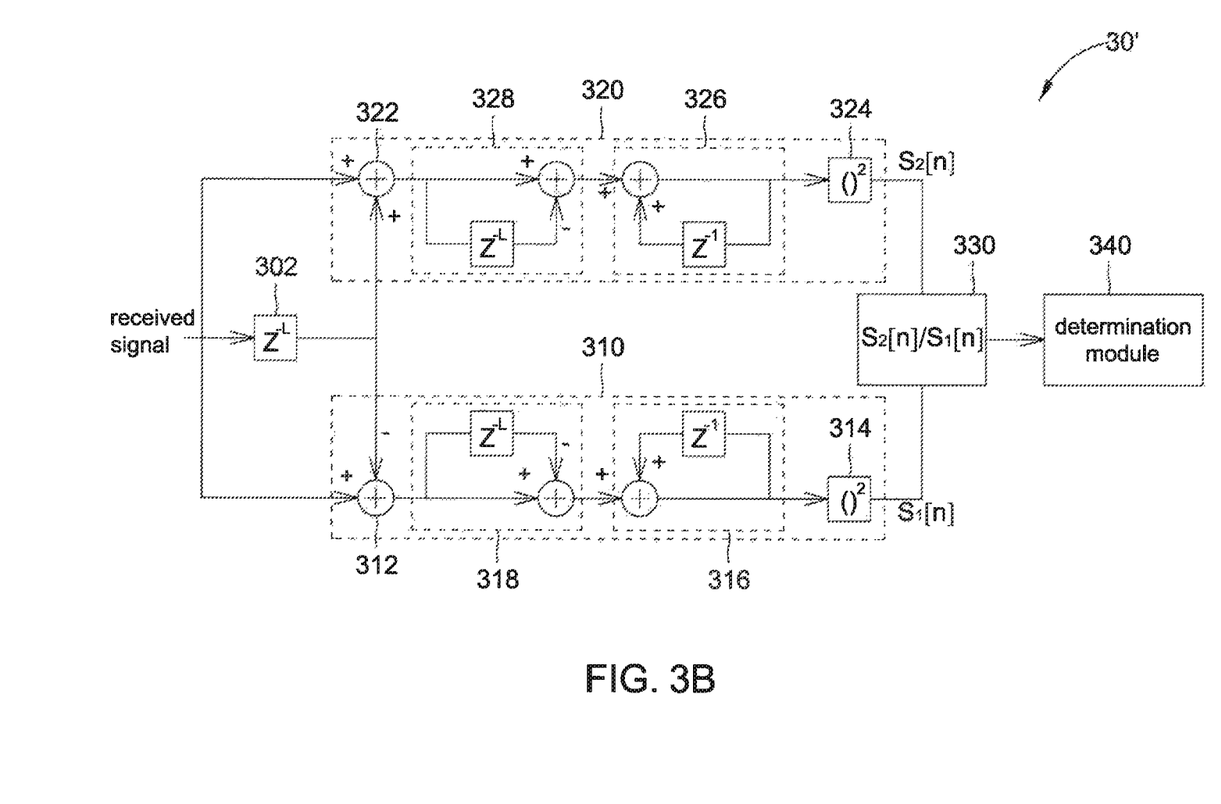
FIG. 3B is a schematic diagram of a signal detection device according to another embodiment of the present invention.

It should be noted that, the circuit structure of the signal detection device 30 in FIG. 3A is one example of many possible implementation methods. For example, FIG. 3 shows a schematic diagram of another signal detection device 30' according to another embodiment of the present invention. As shown in FIG. 3B, operation details and structure of the signal detection device 30' are similar to those of the signal detection device 30, and so signals and elements of the same functions are represented by the same denotations. One main difference of the signal detection device 30' from the signal detection device 30 is that, in the calculation units 310 and 320 of the signal detection device 30', the circuit configuration is sequentially the replacing unit, the summing unit and the squaring unit. In the above situation, the replacing unit replaces a subtraction result or an addition result of a period by another subtraction result or another addition result of a next period. In comparison, in the calculation units 310 and 320 of the signal detection device 30, the circuit arrangement is sequentially the squaring unit, the replacing unit and the summing unit. Although having a different circuit arrangement, the circuit structure of the signal detection device 30' still achieves the same effects, i.e., generating the first detection parameter $S_1[n]$ and the second detection parameter $S_2[n]$ and accordingly calculating the detection function ξ[n]. Operation details of the signal detection device 30' may be referred from the description associated with the signal detection device 30, and shall be omitted herein.

In addition, the signal detection devices above include one single delay unit and two calculation units, and have circuit structures that provide a calculation results associated with one single second period component p[n−L] (i.e., equations (6) and (7)). In another embodiment, a signal detection device may include multiple delay units and calculation units in twice the number of the delay units. A part of the calculation units have a structure similar to that of the calculation unit 310, and a part of the calculation units have a structure similar to that of the calculation unit 320. As such, the results generated by the calculation units may be further summed to provide calculation results associated with multiple second period components (e.g., p[n−L], p[n−2L] and p[n−3L]) (as equations (4) and (5)). One person skilled in the art may deduce implementation details based on the circuit structures of FIG. 3A and FIG. 3B and the associated description, and such details shall be omitted herein.

Figure 4A:
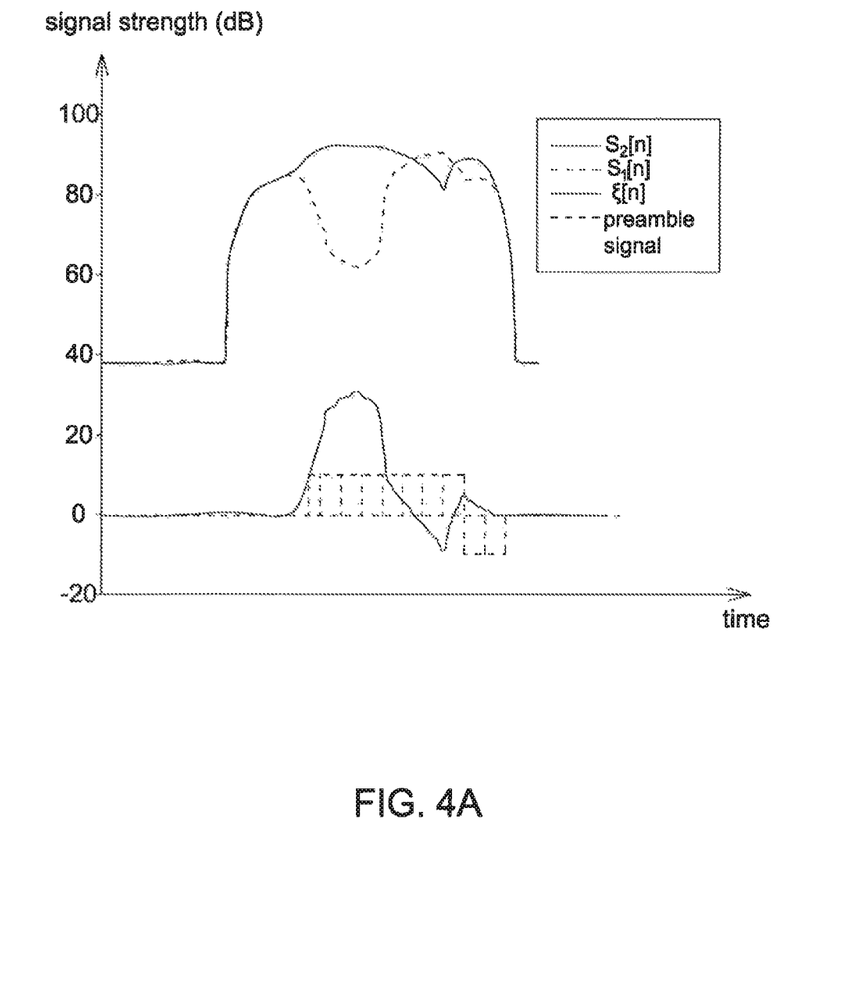
FIG. 4A is a schematic diagram of a preamble signal and a receiver circuit performing preamble signal detection according to an embodiment of the present invention.

FIG. 4A shows a schematic diagram of a preamble signal and a receiver circuit detecting the preamble signal according to an embodiment of the present invention. As shown in FIG. 4A, the preamble signal is received within about time intervals 10000 to 20000. Each frame represents a period component of the preamble signal, the last two frames represent inverted period components, and the foremost small frame represents a signal of one-half period length, as satisfying a preamble signal format (as shown in FIG. 3) of PLC specifications. FIG. 4A further depicts waveforms of the first detection parameter $S_1[n]$, the second detection parameter $S_2[n]$ and detection function ξ[n] obtained according to the above calculations (equations (4) to (15)). It is seen from FIG. 4A that, before the receiver circuit receives the preamble signal, the detection function ξ[n] is kept at 0 dB. The detection function ξ[n] noticeably rises when the preamble signal is received, and lowers to below 0 dB as the inverted period components at the end of the preamble signal are received. Thus, according to system requirements, the receiver may select a threshold greater than 0 dB, and determine whether the preamble signal is received according to whether the detection function ξ[n] exceeds the threshold.

It should be noted that, the signal detection method of the present invention is applicable to situations where a large noise or severe signal attenuation is present. More specifically, given that characteristics of AGWN are satisfied, the value of the detection function ξ[n] calculated is bound to be twice the signal-to-noise ratio plus 1. When the receiver receives only the noise, the value of the detection function ξ[n] is bound to be 1. When the noise is large or even larger than the signal strength, even if the SNR is very small, the value of the detection function ξ[n] is still greater than 1. Therefore, as opposed to a conventional delay correlator that is incapable of processing situations with a large noise or severe signal attenuation, the signal detection method implemented through the calculation of the detection function ξ[n] stays operable in situations with a large noise or severe signal attenuation, and provides a more robust signal detection capability.

The above calculation process is exemplified by detecting a preamble signal of a PLC system, and is not limited to such example. Given the signal to be detected has a periodic property, the first detection parameter $S_1[n]$ and the second detection parameter $S_2[n]$ may be obtained by subtraction or addition of different period components to further calculate the detection function ξ[n] for signal detection.

It should be noted that, if the signal received contains a DC bias, the calculation method of the above detection function ξ[n] may be affected. For example, in the presence of a DC signal, the second detection parameter $S_2[n]$ is equal to:

$$S_2[n]=4Ep+2Ew+V\_DC \quad (16)$$

In equation (16), V_DC represents a DC signal. Further, as the first detection parameter $S_1[n]$ is associated with a subtraction result of two signals, the first detection parameter $S_1[n]$ after the subtraction does not contain any DC components. In the above situation, the detection function ξ[n] obtained from dividing the second detection parameter $S_2[n]$ by the first detection parameter $S_1[n]$ still contains the DC components. The DC components may lead to the misjudgment of the preamble signal.

Figure 4B:
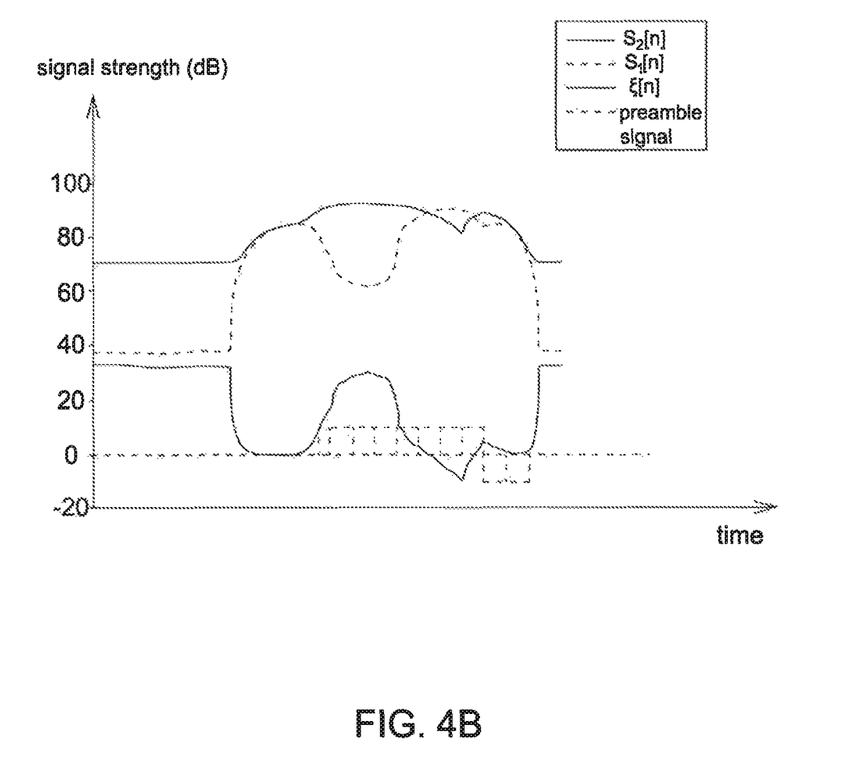
FIG. 4B is a schematic diagram of a preamble signal and a receiver circuit performing preamble signal detection in the presence of DC signals.

FIG. 4B shows a schematic diagram of a preamble signal and a receiver circuit performing preamble signal detection in the presence of a DC signal. As shown in FIG. 4B, before the preamble signal is received, due to the DC signal, the detection function [n] is caused to rise or is kept at a high level, such that the receiver may erroneously determines that the preamble signal is received and thus starts to receive the signal.

For the above issue, the present invention provides a match filter approach for solving the misjudgment caused by a DC signal. Similarly, the match filter may be realized by a digital logic circuit of the receiver, and may be incorporated with the foregoing calculation method of the detection function ξ[n] to perform signal detection.

Figure 5:
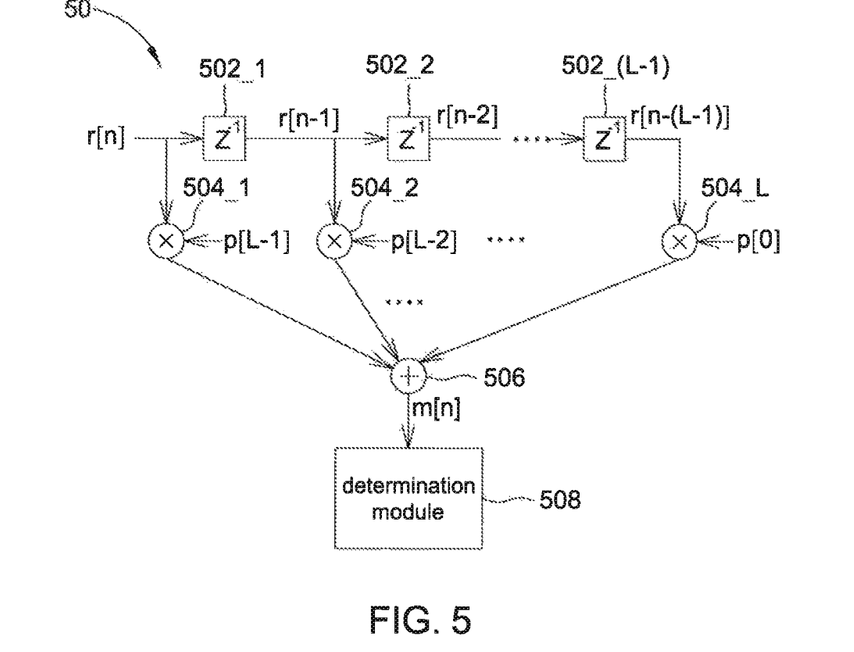
FIG. 5 is a schematic diagram of a match filter according to an embodiment of the present invention.

FIG. 5 shows a schematic diagram of a match filter 50 according to an embodiment of the present invention. As shown in FIG. 5, the match filter 50 includes delay units 502_1 to 502_(L−1), multipliers 504_1 to 504_L, a summing unit 506 and a determining unit 508. The delay units 502_1 to 502_(L−1) retrieve L signal components (e.g., r[n], r[n−1], r[n−2], and r[n−(L−1)]) of a preamble signal. The multipliers 504_1 to 504_L receive L predetermined signal components p[L−1], p[L−2], . . . and p[0] of a predetermined signal p[n]. Each of the multipliers 504_1 to 504_L multiplies a corresponding signal component of the L signal components r[n], r[n−1], r[n−2], . . . , and r[n−(L−1)] by a predetermined signal component of the L predetermined signal components p[L−1], p[L−2], . . . and p[0] to generate L multiplication results. The summing unit 506, coupled to the multipliers 504_1 to 504_L, sums the L multiplication results to generate a match function m[n]. The summing unit 506 is chiefly formed by an adder. The determination module 508 determines whether the preamble signal is received according to the matching function m[n].

In other words, when the receiver performs match filtering, the received preamble signal is matched with the predetermined signal n[n]. In one embodiment, the predetermined signal p[n] may include a period signal (e.g. the period component p[n] in FIG. 1) in the preamble signal. The receiver may correspondingly multiply the preamble signal and the predetermined signal p[n] and sum up to generate the match function m[n]. More specifically, the receiver may continuously receive the signal r[n] from the channel, retrieve the part of the signal r[n] having the same length as the predetermined signal p[n], and multiply the part of the signal r[n] retrieved by the corresponding predetermined signal p[n]. Thus, the signal received with may be continuously multiplied with the predetermined signal p[n] to generate the match function m[n]. As such, the match function m[n] may be represented as:

$$m[n] = \sum_{i=0}^{L-1} r[n+L-1-i] p[i] \quad (17)$$

In equation (17), L is the length of the predetermined signal p[n], and may be the length of one period of the preamble signal. In other embodiments, for example but not limited to, the predetermined signal p[n] may include multiple preamble signal periods.

According to signal characteristics, the integration or summation result of two independent and lowly correlated signals multiplied with each other is approximately equal to 0. However, the integration or summation result of two identical signals multiplied by each other yields an extremely large value. In the match filter operation, the received signal r[n] is continuously multiplied with the predetermined signal p[n], and integrated or summed within a signal length (i.e., the length of the predetermined signal p[n]). If the interval of the signal r[n] that is multiplied exactly corresponds to the predetermined signal p[n] and has an identical or similar waveform as the predetermined signal p[n], a quite large value is obtained for the match function m[n] after the summation. On the other hand, if the interval of the signal r[n] that is multiplied is different from the waveform of the predetermined signal p[n], the value obtained after the summation is close to 0. As such, when receiver receivers the preamble signal, the match function m[n] generated contains several surges. The time point at which each surge appears is a time point at which the waveform of the multiplied interval of the signal r[n] is identical to the waveform of the predetermined signal p[n], and the period of each appearing surge is substantially equal to the period of the preamble signal.

Thus, after the receiver circuit receives the match function m[n], whether the preamble signal is received may be determined according to whether the surge appears. For example, a threshold $\eta_2$ for the match function m[n] may be set; it is determined that the signal is detected when the value of the match function m[n] is greater than or equal to the threshold $\eta_2$ (i.e., the surge appears), and it is determined that the signal is not detected when the value of the match function m[n] is smaller than the threshold $\eta_2$.

On the other hand, when a DC signal appears while the receiver does not receive the preamble signal, the surge does not appear in the match function (i.e., because the waveform of the DC signal is different from that of the predetermined signal p[n]). Therefore, through the match filter approach, signal misjudgment caused by the DC signal may be effectively prevented.

It should be noted that, in a PLC system, as the signal format and the waveform of the preamble signal are known, the predetermined signal p[n] may be set to be the same as a period component of the preamble signal and be used to match the received signal r[n]. Similarly, the operation method of the above match filter is not limited to detecting a preamble signal in a PLC system, and may be applied to other communication systems or different signals. Given the signal to be detected is periodic, the calculation of the match filter may be used to perform signal detection. In addition, the match filter of the present invention may be used to detect a predetermined signal. Further, even if the signal to be detected is influenced by other periodic noises, as long as the period or waveform of the periodic noise is different from the period or waveform of the signal to be detected, the detection effect of the predetermined signal is unaffected.

Figure 6:
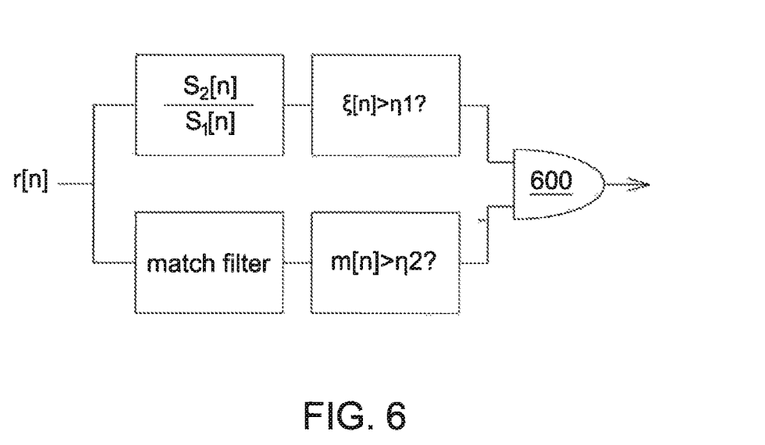
FIG. 6 is a schematic diagram of a calculation method incorporating a match filter and detection functions according to an embodiment of the present invention.

Further, the operation method of the above match filter may incorporate the calculation of the detection function ξ[n]. FIG. 6 shows a schematic diagram of a match filter incorporating a calculation method of the detection function ξ[n] according to an embodiment of the present invention. As shown in FIG. 6, when the receiver circuit receives the signal r[n], the calculation for the detection function ξ[n] for the signal r[n] and the process of the match filter may be simultaneously performed. More specifically, the receiver circuit may obtain the first detection parameter $S_1[n]$ and the second detection parameter $S_2[n]$ through subtraction and addition of different period components, and divide one by the other to calculate the detection function ξ[n]. Next, it is determined whether the value of the detection function ξ[n] is greater than the threshold $\eta_1$, and the determination result is outputted to the logic circuit 600. For example, "1" may be outputted when the value of the detection function ξ[n] is greater than or equal to the threshold $\eta_1$, and "0" may be outputted when the value of the detection function ξ[n] is smaller than the threshold $\eta_1$. On the other hand, the receiver circuit may multiply the signal r[n] by the predetermined signal p[n] through the calculation of the match filter to calculate the match function m[n]. Next, whether the value of the match function m[n] is greater than the threshold $\eta_2$ determined, and the determination result is outputted to the logic circuit 600. For example, "1" may be outputted when the value of the match function m[n] is greater than or equal to the threshold $\eta_2$, and "0" may be outputted when the value of the match function m[n] is smaller than the threshold $\eta_2$.

In this embodiment, the logic circuit 600 may be implemented by an AND gate. As such, only when the value of the detection function ξ[n] is greater than or equal to the threshold η$_1$, and the surge appears in the match function m[n] and the peak value of the surge is greater than or equal to the threshold η$_2$, it is determined that the signal is received. Conversely, when the value of the detection function ξ[n] is smaller than the threshold η$_1$ or the value of the match function is smaller than the threshold η$_2$, it is determined that the signal is not received. Thus, misjudging the DC signal as the preamble signal may be prevented.

Figure 7:
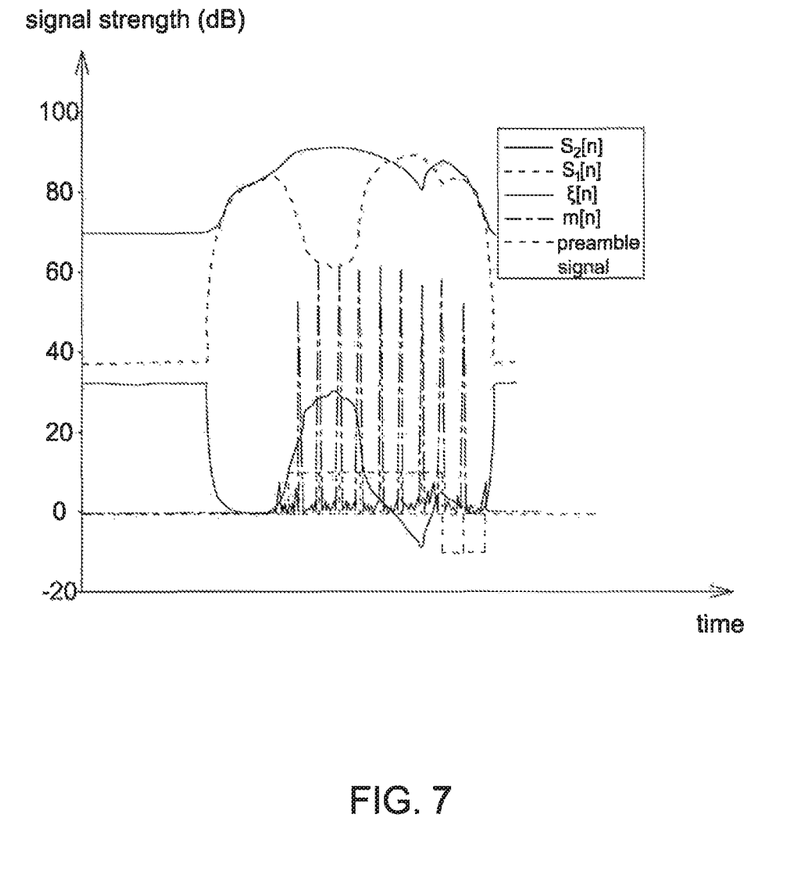
FIG. 7 is a schematic diagram a calculation method incorporating a match filter and detection functions in the presence of DC signals.

FIG. 7 shows a schematic diagram of a receiver circuit incorporating the detection function ξ[n] and the match function m[n] for detecting the preamble signal in the presence of the DC signal. As shown in FIG. 7, before the preamble signal is received, even if the presence of the DC signal causes the detection function ξ[n] to be kept at a high level, the receiver is nonetheless capable of correctly determining that the signal is not received because no surge appears in the match function m[n]. When the preamble signal is received, the detection function ξ[n] rises and the surge at the same time appears in the match function m[n], and so the receiver may determine that the preamble signal is received and thus starts receiving data.

It should be noted that, the present invention is capable of effectively performing signal detection through the calculation of the detection function and the process of the match filter. One person skilled in the art may make modifications and variations to the present invention accordingly, and the present invention is not limited to the above non-limiting embodiments. For example, in the foregoing embodiments, a preamble signal in a PLC system is processed. However, in other embodiments, signals of other communication systems may also be processed. As previously described, given the signal to be detected is periodic, the signal may be detected using the method of the present invention. Further, in the present invention, for example, the calculations of the first detection parameter S$_1$[n] and the second detection parameter S$_2$[n] are obtained by summing a subtraction or addition result of the first period component and at least one second period component adjacent to the first period component. In other embodiments, for example but not limited to, different period components may be subtracted or added from/to one another. Further, the at least one second period component for the calculation may include period components in any desired number. To enhance the reliability of the signal detection, as the correlation among noises included in a larger number of period components gets lower, a larger number of period components may be used for the calculation to more effectively eliminate the effects of noises upon signal detection. On the other hand, the circuit structure in FIG. 6 is one of many possible implementations of the present invention, and the calculation of the detection function and the process of the match filter may be incorporated with other methods to realize accurate signal detection.

In conclusion, the present invention provides a signal detection method and device. The signal detection method is applicable to a communication system where a large noise or severe signal attenuation is present, e.g., a PLC system, to effectively reduce the interference that noises and DC signals cause on signal detection. Through the signal detection method of the present invention, the detection function calculated is operable in the presence of a large noise or even a noise greater than the signal strength, and provides a robust signal detecting capability. The match filter may be applied to prevent the DC signals on the channel from interfering the signal detection. Meanwhile, the signal detection device of the present invention may be simply implemented through a digital logic circuit, and may realize the calculations of the detection function and the match filter using a combination of several adders, multipliers and delayers. Thus, with the operation of the match filter incorporated with the calculation of the detection function, signal detection may be accurately achieved to allow the receiver to more effectively receive data.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal detection method, for detecting a signal having a periodic format in a communication system, comprising:
   retrieving a first period component of the signal and at least one second period component adjacent to the first period component;
   in a first calculation circuit, squaring a subtraction result of subtracting the first period component and each second period component of the at least one second period component from each other to calculate at least one first square value, and summing the at least one first square value to obtain a first detection parameter;
   in a second calculation circuit, squaring an addition result of adding the first period component and each second period component of the at least one second period component to each other to calculate at least one second square value, and summing the at least one second square value to obtain a second detection parameter;
   a divider dividing the second detection parameter from the second calculation circuit by the first detection parameter from the first calculation circuit to obtain a detection function; and
   when a value of the detection function is greater than or equal to a first threshold, determining that the signal is detected; when the value of the detection function is smaller than the first threshold, determining that the signal is not detected,
   the signal detection method further comprising performing a match filter operation on the signal, comprising:
   matching the signal with a predetermined signal to obtain a match function; and
   when a value of the match function is greater than or equal to a second threshold and the value of the detection function is greater than or equal to the first threshold, determining that the signal is detected; when the value of the match function is smaller than the second threshold or the value of the detection function is smaller than the first threshold, determining that the signal is not detected.

2. The signal detection method according to claim 1, wherein the value of the detection function is twice a signal-to-noise ratio (SNR) plus 1.

3. The signal detection method according to claim 1, wherein the communication system is a Power Line Communication (PLC) system.

4. The signal detection method according to claim 3, wherein the signal is a preamble signal transmitted in the PLC system.

5. The signal detection method according to claim 1, wherein the step of matching the signal with the predetermined signal to obtain the match function comprises:
   summing a multiplication result of multiplying the signal with the predetermined signal to generate the match function.

6. The signal detection method according to claim 1, wherein the predetermined signal comprises at least one period signal in a preamble signal.

7. A signal detection device, detecting a signal in a communication system, comprising:
   a first delay circuit, delaying a first period component of the signal to retrieve a second period component adjacent to the first period component;
   a first calculation circuit, coupled to the first delay unit, comprising:
   a subtractor, subtracting the first period and the second period component from each other to obtain a subtraction result;
   a first squaring circuit, squaring the subtraction result to calculate a first square value; and
   a first summing circuit, summing the first square value of a period to obtain a first detection parameter;
   a second calculation circuit, coupled to the first delay circuit, comprising:
   an adder, adding the first period component and the second period component to each other to obtain an addition result;
   a second squaring circuit, squaring the addition result to calculate a second square value; and
   a second summing circuit, summing the second square value of the period to obtain a second detection parameter;
   a divider, coupled to the first calculation circuit and the second calculation circuit, dividing the second detection parameter by the first detection parameter to obtain a detection function; and
   a first determination module, coupled to the divider, receiving the detection function, determining that the signal is detected when a value of the detection function is greater than or equal to a first threshold, and determining that the signal is not detected when the value of the detection function is smaller than the first threshold.

8. The signal detection device according to claim 7, wherein each of the first calculation circuit and the second calculation circuit comprises:
   a replacing circuit, replacing the subtraction result or the addition result of the period by another subtraction result or another addition result of a next period.

9. The signal detection device according to claim 7, wherein each of the first calculation circuit and the second calculation circuit comprises:
   a replacing circuit, replacing the first square value or the second square value of the period by another first square value or another second square value of a next period.

10. The signal detection device according to claim 7, wherein a value of the detection function is twice a signal-to-noise ratio (SNR) plus 1.

11. The signal detection device according to claim 7, wherein the communication system is a Power Line Communication (PLC) system.

12. The signal detection device according to claim 11, wherein the signal is a preamble signal transmitted in the PLC system.

13. The signal detection device according to claim 7, further comprising a match filter, the match filter comprising:
   a plurality of second delay circuits, retrieving a plurality of signal components of the signal;
   a plurality of multipliers, receiving a plurality of predetermined signal components of a predetermined signal, wherein each of the plurality of multipliers multiplies a corresponding signal component of the plurality of signal components with a corresponding predetermined signal component of the plurality of predetermined signal components to generate a plurality of multiplication results; and
   a third summing circuit, coupled to the plurality of multipliers, summing the plurality of multiplications results to generate a match function.

14. The signal detection device according to claim 13, wherein the match filter further comprises:
   a second determination module, determining that the signal is detected when a value of the match function is greater than or equal to a second threshold and the value of the detection function is greater than or equal to the first threshold, and determining that the signal is not detected when the value of the match function is smaller than the second threshold or the value of the detection function is the smaller than the first threshold.

15. The signal detection device according to claim 13, wherein the predetermined signal comprises a period signal in a preamble signal.

* * * * *